Patented May 9, 1950

2,507,465

UNITED STATES PATENT OFFICE 2,507,465

ORGANIC FILLERS AND EXTENDERS AND PROCESSES OF PRODUCING THE SAME

Joseph W. Ayers, Easton, Pa., assignor to Agrashell, Inc., Los Angeles, Calif., a corporation of Delaware No Drawing. Application July 15, 1946,
Serial No. 683,767

4 Claims. (Cl. 106—288)

This invention relates to improved walnut shell flours and other natural organic fillers and extenders, and to methods of producing the same. Although not limited to such use, the novel products have been most successfully employed in the plywood industry as an adhesion promoter and extender for synthetic resin glues.

Natural organic fillers of various particle sizes have been used in molding plastics, adhesives and in other industrial products and processes with varying degrees of success. For the most part the fillers have been of comparatively coarse size, that is below 100 mesh. Wood flour of 200 mesh size, for example, has been considered of very fine particle size and has been employed in the industry to a comparatively small extent. Of the natural organic fillers and extenders now manufactured, various types of wood flour are most extensively used. Substantial quantities of nut shell flour produced from English walnut shells and limited quantities of other products from coconut shells, apricot pits and the like are consumed by industries in the production of a number of products.

A substantial deterrent to the use of natural organic fillers in industrial processes, particularly in synthetic resin compositions, has been the lack of uniformity in successive batches or shipments due to variations in the properties of the raw vegetable material in turn arising from differences in the locality of their origin and the weather conditions during their growth. One batch of walnut shell flour as heretofore produced may work very satisfactorily when compounded with an emulsified synthetic resin adhesive and a second batch produced in the same identical way but from other raw walnut shells may cause the emulsion to break and the adhesive to become worthless.

An object of the present invention is to provide a process of producing nut, wood, and other natural organic flours in uniform and consistent quality. Another object is to provide a superior organic filler capable of promoting the adhesive quality of synthetic resin glues used particularly in the plywood industry.

It has now been ascertained that the lack of uniformity in the performance of natural organic fillers and extenders has been due to variation in the acidic content or acidity in the vegetable material from which the filler or extender is produced. It is known that natural vegetable materials like wood and nut shells contain free organic acids such as acetic, formic and gallic acids. Fillers and extenders produced from such materials normally have a pH value of from 2.5 to 4. Although a product having a pH value as low as 4 may be acceptable as an extender in the production of certain adhesives, products of greater acidity almost invariably lead to unsatisfactory results. For most synthetic resin adhesives it has now been ascertained that the organic filler should possess a pH value between 4.5 and 6. In the formulation of other synthetic resin glues, it is necessary or most beneficial to employ fillers having a pH value as high as 7 or even 10.

The hereinbefore mentioned objects are accomplished by the present invention through a process involving broadly the addition of an aqueous dispersion of a base to the natural organic material in coarse form and the simultaneous grinding and drying of the mixture in a suitable mill. The amount of base employed is that which is calculated to increase the pH of the ground material to the desired value and in which the grinding produces a product of quite fine particle size. The grinding operation is preferably conducted in a mill of a type which develops the heat required for the drying of the organic material. The simultaneous grinding and drying causes the base to become uniformly distributed throughout the material and to react with the free acids on the surface of the particles. As a result a finely divided product of uniform pH value is obtained.

The processes of the present invention are applicable to the treatment of natural vegetable materials in general which are capable of being dry ground into products of fine particle size. In the production of wood flour it is applicable to a variety of woods, such as pine, hemlock, redwood, basswood, oak, fir and others. The process is particularly applicable to the production of nut shell flours from English walnut shells, almond shells, pecan shells, palm nut shells, black walnut shells and others. Other raw materials from which the new fillers may be produced are pits such as those salvaged from apricots, olives, dates, cherries and the like. The process is also applicable to corn cobs, barks of trees, hulls, such as cotton seed hulls, and to stems such as the shives of flax. Fillers may generally be produced from pericarps and endocarps of dupes.

For accomplishing the neutralization during the grinding and drying operation an aqueous dispersion of substantially any base may be employed.

Most any inorganic or organic base may be employed, suitable examples being sodium hydroxide, ammonium hydroxide, magnesium oxide, zinc oxide, aluminum hydroxide, barium hydroxide, sodium carbonate, sodium bicarbonate and others. A suitable organic base is pyridine. Bases may be employed which are also buffing agents, examples of the same being formaldehyde, triethanolamine, sodium hydrogen phosphate and sodium monohydrogen phosphate.

The dispersion may be in the form of a true solution or in the form of a slurry. The concentration of the base in the water is unimportant in the accomplishment of the objects of the invention with the limitation that the amount of water present must not be sufficient to interfere with the grinding operation and the production of a dry ground product in the mill. The concentration of the base in the water should be of a character to provide a flowable stream which can be measured or metered for proportioning the same with reference to the amount of natural organic material introduced into the mill.

The process of the present invention is preferably carried out in a continuous procedure in which the natural organic material in coarse form and the aqueous dispersion of the base in proper amounts are continuously fed through the grinding mill.

The base or buffing agent is preferably added in the form of a solution or slurry of dilute concentration. It is preferably added directly to the grinding mill into the organic material being ground. During the grinding operation the heat developed causes evaporation of the water or other solvent or carrier and the formation of a concentrated solution which reacts with the free acids with which it comes into contact. The rate at which the base dispersion is fed to the mill is adjusted in relation to the quantity of acid present in the raw vegetable feed going into the mill to obtain the desired pH value in the finished product.

The process of the present invention is particularly applicable to the production of adhesive extenders from English walnut shell flour. Tests conducted on walnut shell flour most of which passed through a 325 mesh screen indicated that the concentration of free acids varied from .25 to 1.50%. Qualitative analyses of this material showed that the acids were composed principally of formic and acetic acids and to a lesser degree of gallic acid together with very small amounts of butyric, propionic, valeric and lactic acids.

In a practical commercial operation producing a walnut shell flour in accordance with the present invention, walnut shells were fed into a grinding mill at the rate of 1,000 pounds per hour. A 20% sodium hydroxide solution having a specific gravity of 1.22 and a Baumé of 26.2% was continuously fed into the mill at the rate of from ¼ gallon to 1½ gallons per hour and as a result the pH of the walnut shell flour obtained was within the range of 4.5 to 5.5 inclusive. The product obtained was of extraordinarily fine particle size and at least 90% of the flour passed through a 325 mesh screen. The addition of the sodium hydroxide solution to the shell material does not increase the water content thereof more than about 1% and hence neither the essentially dry character of the material fed into the mill nor the dry operating character of the grinding operation is changed by such addition.

The walnut shell flour produced in this manner is particularly suitable for the production of synthetic resin adhesives especially of the phenolic and urea types which are quite widely used in the woodworking industry and particularly in the production of all-weather plywood. In these synthetic resin glues the walnut shell flour extender of the present invention is not just a filler in the ordinary sense in which this word is employed. The walnut shell flour increases the adhesion and the strength of the bond between the veneers such that the plywood produced therefrom is from 15 to 20% stronger than the plywood would be without the flour. This strength is attributable to several factors. The natural resins in the walnut shell flour enter into chemical reaction with the synthetic resin adhesives and form a strong bond between the flour and the glue. The presence of the walnut shell flour in the resin solution assists in the spreading of the glue uniformly over the surfaces of the veneer and helps to prevent deposits of thick pockets of the glue in the depressions which invariably are present in the veneer surfaces. The presence of a localized glue mass and a consequent weak spot in the structural make-up of the board is thereby avoided.

The very fine particle size walnut shell flour of the present invention has the distinct advantage of sealing the pores of wood to which it is applied as the adhesive solution is spread over the veneer. Excessive penetration of the glue solution into the wood cells is prevented and as a result much less glue is required for obtaining the required adhesion. The use of less glue is not only of economic value from the saving of the glue but the production rate of plywood is increased for the reason that the curing time of plywood is influenced by the amount of resin adhesive used and the less resin there is present during the curing operation, the shorter the time required to polymerize the resin during the curing operation.

The process of the present invention has the distinct advantage of providing walnut shell flours and as well flours of other vegetable material having an acidity to suit specific applications. For example, it is advantageous in the compounding of some synthetic resin glues immediately before use to increase its acidity such that the curing time may be reduced. In this instance a walnut shell flour of predetermined slight acidity may be added to the glue without causing premature advancement of the resinification reaction or setting of the resin. The increase in acidity within a permissible degree is of advantage because it means that more square feet of plywood can be cured in a given time and production capacity is thereby increased. In the production of other synthetic resin glues no alteration of the acidity is permissible and in this case a walnut shell flour having a pH of 7 can be employed with obvious advantages.

The walnut shell flour glues of the present invention have substantially all of the advantages of prior synthetic resin glues heretofore produced, such as the good resistance to weather and water, the ability to add substantial quantities to adhesive solutions without increasing their viscosities beyond workable limits, the unsusceptability to mold and fungi and the obvious price advantage arising from the dilution of a resin solution costing from 16 to 33¢ a pound by a filler costing only a few cents a pound. Satisfactory adhesive solutions may be produced very easily with as much as 30% of the walnut shell flour. Loadings as high as 40%, under proper conditions, can be accomplished without adversely affecting the quality of the board.

The spray drying of synthetic resin adhesives is greatly facilitated by the incorporation of the walnut shell flour of the present invention, for its presence prevents the resin particles from sintering during the spray drying operation, that is the resin particles are prevented from cohering and sticking together. As a result of the improved drying operation, the dried product, which is in a more dispersed condition, can be put back into solution again and can be spread more uniformly by machines on the glue line.

The walnut shell flours and other flours within the scope of the present invention are not limited to use in synthetic resin adhesives for they are also suitable for use in many other industrial fields where low gravity organic fillers and extenders have been suggested. They may be employed in plastics, insecticides, rubber, paints and varnishes, cements, caulking compounds, soaps, refractories, foundry partings, pharmaceuticals and cosmetics, linoleum and dynamite. They are particularly suitable in industrial productions where the specification requirements are very rigid, such as in plastics, insecticides, pharmaceuticals and cosmetics.

The neutralization of the acids in walnut shell flour or in other finely divided organic materials could of course be accomplished by adding a solution or slurry of the base to the finely divided material and a dried product produced therefrom by filtering, drying and disintegrating. This wet method of adding alkali is accompanied by several disadvantages, namely, it requires a large amount of tap water which introduces an objectionable amount of ionizable salts; it causes agglomeration of the particles which requires recrushing if a uniform powder material is to be obtained; and an uneven distribution of the base on the particles obtained results in less uniform neutralization.

This method of adjusting the acidity furthermore is prohibitive in cost due to the expense of the separate treating operations. The fillers and extenders must for competitive reasons sell at a very low price if they are to be accepted in commercial fields.

The process of the present invention is simple to operate and is very effective for accomplishing the production of a uniform filler. It adds very little cost to the filler produced, for the amount of neutralizing agent is small and there is no extra handling of the raw material or the ground material produced. The heat of drying is provided by the friction of the grinding operation and the cost of the grinding operation is not increased by the presence of the base.

The present invention should not be confused with those grinding processes involving the cooking or reaction of vegetable material in the wetted state with sodium hydroxide or other alkalies in which the cellulose is hydrolyzed and the lignins present are released. The process of the present invention does not change the natural or general character of the vegetable material and the only chemical change that takes place apparently is the reaction between the free organic acids in the vegetable flour particles and the base or buffing agent added. The cellulosic and lignin contents are not noticeably altered by the treatment.

It should be understood that the present invention is not limited by the examples and concentrations herein given but that it extends to all equivalents which will occur to those skilled in the art upon consideration of the claims appended hereto.

I claim:

1. The process of producing organic fillers and extenders of reduced acidity from natural vegetable organic materials which comprises, continuously introducing such organic materials in coarse condition into a dry-operating, fine grinding mill, continuously introducing an aqueous dispersion of a base into said mill into such organic material in a quantity calculated to provide a mixture having a pH value of from 4.5 to 10, the amount of water in said added dispersion being insufficient to change the essentially dry character of the feed and of the grinding operation, simultaneously grinding and drying the mixture in the mill, the latter with the aid of heat developed in the grinding operation, and when the vegetable material has been ground sufficiently fine to pass through a 100 mesh screen continuously withdrawing the same from the mill.

2. The process of producing a walnut shell flour extender which comprises introducing walnut shells into a grinding mill, continuously introducing an aqueous dispersion of a base into said mill into the shell material in a quantity calculated to increase the pH of the shell material to a pH value of from 4.5 to 6, subjecting the resulting essentially dry mixture to a grinding operation while simultaneously driving off water added with the base; the latter being effected with the aid of heat developed in the grinding operation, and continuously withdrawing walnut shell flour from the mill of a fineness which for the major part will pass through a 325 mesh screen.

3. The process of producing a walnut shell flour extender which comprises, continuously introducing English walnut shells into a grinding mill, continuously introducing an aqueous dispersion of a base into said mill in a quantity calculated to and which does produce an acidity in the walnut shell flour obtained equivalent to a pH value of from 4.5 to 6, grinding such mixture and thereby providing a walnut shell flour at least 90% of which will pass through a 325 mesh screen, and during said grinding simultaneously drying the mixture in the mill by means of the heat developed in the grinding operation.

4. The process of producing organic fillers and extenders of reduced acidity from nut shell materials which comprises, continuously introducing such nut shell materials in coarse condition into a dry operating, fine grinding mill, continuously introducing an aqueous dispersion of a base into said mill into such nut shell material in a quantity calculated to provide a mixture having a pH value of from 4.5 to 10, the amount of water in said added dispersion being insufficient to change the essentially dry character of the feed and of the grinding operation, simultaneously grinding and drying the mixture in the mill, the latter with the aid of heat developed in the grinding operation, and after the nut shell material has been ground sufficiently fine to pass through a 100 mesh screen continuously withdrawing the same from the mill.

JOSEPH W. AYERS.

REFERENCES CITED

The following references are of record in the file of this patent:

UNITED STATES PATENTS

| Number | Name | Date |
| --- | --- | --- |
| 2,364,721 | Kassay et al. | Dec. 12, 1944 |
| 2,319,182 | Pyl | May 11, 1943 |
| 2,306,292 | Atwood | Dec. 22, 1942 |
| 1,941,059 | Steele | Dec. 26, 1933 |
| 1,631,834 | Schorger | June 7, 1927 |

Certificate of Correction

Patent No. 2,507,465 May 9, 1950

JOSEPH W. AYERS

It is hereby certified that errors appear in the printed specification of the above numbered patent requiring correction as follows:

Column 6, line 11, strike out the words "when the vegetable" and insert instead *after the natural organic*; line 34, after "mill" insert *into the shell material*; lines 37 and 38, strike out "such mixture and" and insert instead *the resulting essentially dry mixture*;

and that the said Letters Patent should be read with these corrections therein that the same may conform to the record of the case in the Patent Office.

Signed and sealed this 1st day of August, A. D. 1950.

[SEAL]

THOMAS F. MURPHY,
*Assistant Commissioner of Patents.*